Patented Jan. 12, 1954

2,665,977

UNITED STATES PATENT OFFICE 2,665,977

COKE BREEZE BONDED BY PORTLAND CEMENT

William A. Engelhart, deceased, late of Pontiac, Mich., by William A. Engelhart, Jr., administrator, Pontiac, Mich., assignor to General Motors Corporation, Detroit, Mich., a corporation of Delaware No Drawing. Application January 29, 1949, Serial No. 73,672

3 Claims. (Cl. 44—26)

This invention relates generally to fuels and is more particularly concerned with a fuel formed of coke breeze bonded by Portland cement and having requisite characteristics whereby the fuel is highly suitable for use as a fuel for cupola melting processes as well as for other metallurgical melting processes and as a fuel generally.

Large amounts of coke are used as a fuel in cupola melting processes. In handling the coke a considerable proportion of it becomes broken up into relatively small sized pieces which are too small to be used successfully as a fuel. The portion of the coke that is too fine to be satisfactory as a fuel is termed "coke breeze." Heretofore coke breeze has been discarded as a material of little or no value since no way was known for successfully utilizing it in cupola melting processes. In general all coke particles that pass through a 1" mesh screen are too fine for use in cupola melting processes and the like and are discarded. In some foundries the portion of the coke that is discarded runs up to coke that will pass through a 2" mesh screen. The proportion of coke breeze will vary somewhat with the grade of coke and the manner in which it is handled. However a typical figure where the minimum size of usable coke is one inch, is around 10% coke breeze in one large foundry. The percentage sometimes runs as high as 20%. Where the minimum size of usable coke is 2 inches, the proportion of coke breeze will be much larger.

In accordance with the present invention coke breeze with Portland cement as a binder is formed into bricks or blocks and the resulting bricks or blocks are highly satisfactory for use in the cupola, as well as in other metallurgical melting processes and as a fuel generally. It will be understood that in cupola melting processes the bricks or blocks have to have considerable strength to withstand the weight of the charge. A fuel brick also has to maintain its form and volume until it reaches the melting zone of the cupola with the additional requirement that it shall have the same or approximately the same burning rate as natural coke and furnish a satisfactory volume of heat. The fuel bricks provided by the present invention satisfy all of the foregoing requirements.

In making the fuel bricks of the present invention, coke breeze together with Portland cement and water are first thoroughly mixed. The mixture is then poured into molds and the molds rapidly vibrated for a short period of time to form a relatively dense yet porous structure. This is an important feature of the procedure since if the mixture is compacted under high pressure, like building bricks are made, the resulting bricks or blocks are too dense to burn successfully in cupolas. For best results the green fuel bricks are given a steam curing operation, described later in detail, although it is within the scope of the invention in its broader aspects to otherwise cure the green bricks.

In making the mixture from which the bricks are made it is desired to use no more Portland cement than needed to form a strong bond for the coke breeze. In commercial practice about 1.1 to 2 cubic feet of Portland cement to a cubic yard of coke breeze has proven satisfactory. Sufficient water is added to the mixture of coke breeze and Portland cement to form a coarse paste such that when a ball of the mixed paste is squeezed in the palm of the hand, it will remain intact but no free water will be seen. Under normal conditions about 8 to 16 gallons of water are employed with each cubic yard of coke breeze and 1.1 to 2 cubic feet of Portland cement. Since coke is porous, the amount of water which it absorbs varies, depending on weather conditions. Dry coke will require more water and coke which has been subjected to rain will require considerably less. If desired the coke breeze may be put through a crushing mill which crushes the larger pieces into smaller particles not larger than ¼" so as to form a more uniform composition.

The several ingredients are thoroughly mixed in any suitable way. In commercial practice a cement mixer of conventional design has proven highly satisfactory.

After being thoroughly mixed the mixture is poured into open molds and the same rapidly vibrated for about from 10 to 15 seconds to bring the solid components into close contact with one another to form a relatively dense but porous structure. A practical and typical size for the fuel bricks is 3½" x 4¾" x 7¾". This sized fuel brick weighs approximately five and one-half pounds. The exact size is not critical and any size comparable to that of natural coke used in cupolas is contemplated.

The green bricks are then removed from the molds and cured. As indicated hereinbefore for best results it is preferred to give the green bricks a steam curing treatment as this provides a more porous structure which has the requisite strength. In commercial practice small trucks carrying frames are loaded with pallets carrying the green bricks. They are stacked one above the other with spaces between each pallet and the whole car moved on tracks into large steel drums where they are cured under steam pressure. After being placed in the curing drums and before steam is admitted the bricks are allowed an initial setting period of from 2 to 3 hours. It has been found that the bricks have a tendency to crumble and lose volume unless this initial setting has been allowed to take place. Steam is then gradually admitted until the pressure in the drum builds up to approximately 90 to 110 pounds per square inch. This requires another two to three hours. The steam pressure is then held at about 90 to 110 pounds per square inch for four hours. The pressure is then reduced to atmospheric pressure, a period of ½ to 1 hour being allowed. This completes the curing cycle and the bricks have attained high crushing strength so that they will not spall off nor disintegrate in the cupola until they have reached the melting zone. Higher steam pressures than those specifically mentioned above are permissible but are unnecessary.

In place of steam curing the fuel bricks it is within the scope of the invention in its broader aspects to otherwise cure the bricks. For example the green fuel bricks after removal from the molds may be allowed to dry in air in a manner similar to that of building blocks. This requires an extended period, for example 28 days. The fuel bricks given the air drying treatment are not as porous as those which are steam cured.

In some instances a small amount of lime on the order of 1% is added to the mixture in forming the green bricks. This acts as a sort of lubricant, making the brick smoother and easier to eject from a mold. Carbon in proper form may be added to the mix from which the bricks are formed.

The fuel bricks comprising coke breeze bonded by Portland cement may be used the same as natural coke in the cupola. Since a portion only of the natural coke sold to the foundry is coke breeze and since the bricks run somewhat higher in ash due to addition of the binder, usual practice is to charge the cupola both with the fuel bricks and natural or regular coke in the proportion of 10 to 30% bricks and 70 to 90% coke.

What is claimed is:

1. The method of forming a fuel brick adapted for use as a fuel in cupola and other melting processes which comprises thoroughly mixing coke breeze, Portland cement and water in the following proportions: one cubic yard coke breeze, 1.1 to 2 cubic feet Portland cement, and 8 to 16 gallons of water, filling an open top mold with said mixed coke breeze, Portland cement and water, rapidly vibrating the mold for from 10 to 15 seconds, removing the formed green brick from the mold and allowing the brick to take an initial set for from 2 to 3 hours, then gradually applying steam to a closed chamber in which the brick is placed until the steam pressure reaches 90 to 110 pounds per square inch, the rate of application of steam being such that the stated pressure is reached in a period of from two to three hours, then holding at said pressure for approximately 4 hours and then reducing the pressure to atmospheric in a time of about ½ to one hour.

2. A fuel consisting essentially of coke breeze bonded by Portland cement into brick form, said coke breeze and Portland cement being substantially non-compacted and the brick porous, said coke breeze and Portland cement being present in the proportions of 27 parts by volume of coke breeze to from about 1.1 to 2 parts by volume of Portland cement, said brick being strong and having substantially the same burning rate in the cupola as natural coke.

3. A fuel for a cupola melting process consisting of 10 to 30% of fuel bricks as in claim 2 and 70 to 90% natural coke.

WILLIAM A. ENGELHART, JR.,
*Administrator of the estate of William A. Engelhart, deceased.*

References Cited in the file of this patent

UNITED STATES PATENTS

| Number | Name | Date |
|---|---|---|
| 190,724 | Roettgerr | May 15, 1877 |
| 824,680 | Zuiderhoek | June 26, 1906 |
| 830,953 | Andes | Sept. 11, 1906 |
| 1,075,135 | Alton | Oct. 7, 1913 |
| 1,236,447 | Kendall | Aug. 14, 1917 |
| 1,453,746 | Carey | May 1, 1923 |
| 1,770,627 | Roberts | July 15, 1930 |
| 2,068,793 | Frauenknecht | Jan. 26, 1937 |

FOREIGN PATENTS

| Number | Country | Date |
|---|---|---|
| 430,233 | Great Britain | June 14, 1935 |